(12) United States Patent
Ingram et al.

(10) Patent No.: US 7,633,284 B2
(45) Date of Patent: Dec. 15, 2009

(54) METHOD AND APPARATUS FOR MANAGING ULTRACAPACITOR ENERGY STORAGE SYSTEMS FOR A POWER TRANSMISSION SYSTEM

(75) Inventors: Michael R. Ingram, Harrison, TN (US); Dale T. Bradshaw, Chattanooga, TN (US); Thomas D. Geist, Knoxville, TN (US); Haresh Kamath, Knoxville, TN (US); Arshad Mansoor, Oak Ridge, TN (US); Doni Nastasi, Knoxville, TN (US); Scott Bunton, Powell, TN (US)

(73) Assignee: Tennessee Valley Authority, Knoxville, TN (US)

( * ) Notice: Subject to any disclaimer, the term of this patent is extended or adjusted under 35 U.S.C. 154(b) by 234 days.

(21) Appl. No.: 11/276,629

(22) Filed: Mar. 8, 2006

(65) Prior Publication Data
US 2006/0241876 A1 Oct. 26, 2006

Related U.S. Application Data

(60) Provisional application No. 60/659,067, filed on Mar. 8, 2005.

(51) Int. Cl.
*G01R 19/00* (2006.01)
*G01R 27/416* (2006.01)
*G01R 31/02* (2006.01)
*H02J 7/00* (2006.01)

(52) U.S. Cl. .............. 324/76.11; 324/426; 324/537; 320/167

(58) Field of Classification Search ........... 324/76.11, 324/537, 426; 320/167
See application file for complete search history.

(56) References Cited

U.S. PATENT DOCUMENTS

| 5,134,356 | A | 7/1992 | El-Sharkawi et al. |
| 6,160,382 | A * | 12/2000 | Yoon et al. ............ 320/136 |
| 6,265,851 | B1 * | 7/2001 | Brien et al. ............ 320/162 |
| 6,700,804 | B1 | 3/2004 | Reichard |
| 6,710,639 | B2 | 3/2004 | Huang |
| 6,794,855 | B2 | 9/2004 | Shimomura et al. |
| 6,795,855 | B2 | 9/2004 | Bonilla et al. |
| 6,933,541 | B1 | 8/2005 | Huang |
| 6,952,335 | B2 | 10/2005 | Huang |
| 6,983,212 | B2 | 1/2006 | Burns |
| 6,987,331 | B2 | 1/2006 | Koeppe et al. |
| 7,388,362 | B2 * | 6/2008 | Yurgil ............... 324/76.11 |
| 2004/0150926 | A1 * | 8/2004 | Wilk et al. ............ 361/42 |

OTHER PUBLICATIONS

"Application of Double-Layer Capacitor Technology to Static Condensers for Distribution System Voltage Control", S. M. Halpin et al, IEEE Transaction on Power Systems, vol. 11, No. 4, Nov. 1996, pp. 1899-1904.

(Continued)

*Primary Examiner*—Amy He
(74) *Attorney, Agent, or Firm*—Sughrue Mion, PLLC

(57) ABSTRACT

A method and apparatus for automatically monitoring and controlling various parameters of individual ultracapacitor cells in a series string of such cells. These parameters are monitored, and a replacement charge current is delivered to any cell which has lost charge due to discharge either external or internal to the cell. Also, the application of this method and apparatus to energy storage systems for an electrical power transmission grid.

15 Claims, 10 Drawing Sheets

OTHER PUBLICATIONS

"Power and Life Extension of Battery-Ultracapacitor Hybrids", R. A. Dougal et al, IEEE Transactions on Components and Packaging Technologies, vol. 25, No. 1, Mar. 2002, pp. 120-131.

"It Looks Like a Battery, But It's An Ultracapacitor", Steve Blankinship, Power Engineering, May 2004, pp. 64-65.

* cited by examiner

METHOD AND APPARATUS FOR MANAGING ULTRACAPACITOR ENERGY STORAGE SYSTEMS FOR A POWER TRANSMISSION SYSTEM

Priority is claimed from Provisional Application No. 60/659,067, Mar. 8, 2005 the entire disclosure of which is hereby incorporated by reference.

BACKGROUND OF THE INVENTION

The invention first relates to a method and apparatus for management of individual cells within an ultracapacitor-based system.

The invention relates to a method and apparatus for management of individual cells within an ultracapacitor-based system.

Ultracapacitors are different from batteries in the following ways:

- Batteries have a relatively flat discharge curve, the discharge curve for an ultracapacitor is capacitive in nature and follows the $E=0.5CV^2$ where E is energy (in joules), C is capacitance (in farads), and V is voltage (in volts).
- Ultracapacitors do not exhibit the "coup-de-fouet" (a sudden drop in voltage at the beginning of discharge of a lead-acid battery), so that the equivalent series resistance (ESR) is easily determined by delta V/delta I. This is less true for a battery.
- Ultracapacitors are particularly sensitive to overvoltage and undervoltage conditions. When ultracapacitor cells are placed in series, variations in capacity, leakage current, and internal resistance can cause some cells to be overcharged while others are undercharged. This can result in conditions that are detrimental to the operation of ultracapacitor cells. Therefore, ultracapacitors must be equalized through some external means.
- Ultracapacitors cannot be equalized in the same way as lead-acid or other batteries, which are typically subjected to long periods of charging at low currents.
- Doing this with an ultracapacitor would cause excessive pressure to build up within a cell (in the case of a sealed design) and electrolyte loss (in the case of a vented design). Therefore, a special circuit is required to ensure that ultracapacitors are equalized.
- Some ultracapacitors can be discharged to zero without incident, whereas batteries cannot. Therefore, the charging circuit used for ultracapacitors must be capable of operating over a wide voltage range.

A high-voltage string requires thousands of ultracapacitor cells placed in series, all of which require equalization. Ideally, individual cells should be monitored for current status and health. The method and apparatus described here is a monitoring, leveling, and control circuit designed to monitor, equalize, and charge individual cells in series to maintain optimal health of the cells and the entire ultracapacitor string.

In physical construction, the ultracapacitor cells in a high-voltage string are physically packaged into "modules," each consisting of a number (typically 10 to 30) of cells, for simplicity of assembly. The construction of the monitoring, leveling, and control circuit can also be simplified by dividing its functions into module-level functions (operating at each module) and top level functions (operating over the entire high-voltage string).

At the module level, a low-cost local controller (local to the module) is used to select, monitor and charge individual cells in a particular module. At the top level, a more sophisticated master controller is used to control the local controllers, directing their functions. The local controllers communicate to a master controller through numerous voltage isolation circuits.

Because of the series connection of ultracapacitor modules, there is not a common electrical connection from which all communication signals can be referenced. The use of optical voltage isolation allows the establishment of a common reference on the master controller side of the isolator.

The communication between local controllers and master controllers is accomplished through the use of a communications protocol; in this case, $I^2C$ was used, although other protocols such as RS-232 may also be used. The communications protocol and data bus circuit must be capable of an adequate rate of data transfer, individual addressing of modules and/or cells, and communication to the local controller.

The local controller commands a charge and monitoring circuit, consisting of a non-isolated dc/dc converter with several advanced features. Among the more advanced features is the ability to change key voltage source parameters on command from local controller, without significantly interrupting operation of the circuit. For example, the switching frequency of the circuit can be adjusted for the use of advanced diagnostic techniques; this operation can be conducted from a remote location without taking the device off-line.

Another key advantage to the use of a local controller is immunity to noise. Previous inventions arrange the circuit so that the voltage level is brought back to the master controller, where it is digitized. This is acceptable for small systems, but is prohibitive in larger systems with thousands of cells. In this invention, the local controller performs all signal processing locally at the module, and sends data digitally to the master computer for post-processing.

To optimize operation and health of the ultracapacitor system, it is advantageous to charge and equalize individual cells as quickly as possible. Previous inventions, such as that described in U.S. Pat. No. 6,983,212, is limited to relatively low currents by the resistance of the circuit board traces. The invention described herein is capable of charging individual cells at a rate as high as 10 A, by using control algorithms such that the resistance of the current path does not limit the charge rate.

The invention described herein charges the ultracapacitor from a voltage source rather than the current source, which is more typically used. The voltage source configuration is safer than a current source, since it limits the voltage of the cell to the maximum setpoint, limiting the degree of overcharge to which it is subjected.

The invention described herein uses a novel approach to setting the current setpoint during charging. The voltage source configuration requires special circuitry to convert the voltage to a current; this is classically accomplished through the use of a resistor or transistor. These approaches cause inefficiency due to high power dissipation in the circuit. The current invention uses a interactive setpoint approach that monitors back current at the charge and monitoring circuit, sets the output voltage of the circuit to a level slightly higher than that of the cell, and measures the effect on the cell. If the resultant current is too high, output voltage can be increased; if the current is too low, output voltage can be decreased.

Similar devices described in the prior art, such as that described in U.S. Pat. No. 6,983,212 (incorporated herein by reference), require the use of 2N relays, where N is the total number of ultracapacitor cells. The present invention requires only N+1 relays, enabling significant cost savings and simplifying operation.

DETAILED DESCRIPTION OF THE INVENTION

The overall purpose of the system is to automatically manage both individual cells and the series combination of cells (one or more strings) under dynamic and static conditions. The identity of multiple individual units (cells or strings) exhibiting a problem is visually prompted along with a detailed time date report on the system disk, monitor and/or printer.

Figure 1:
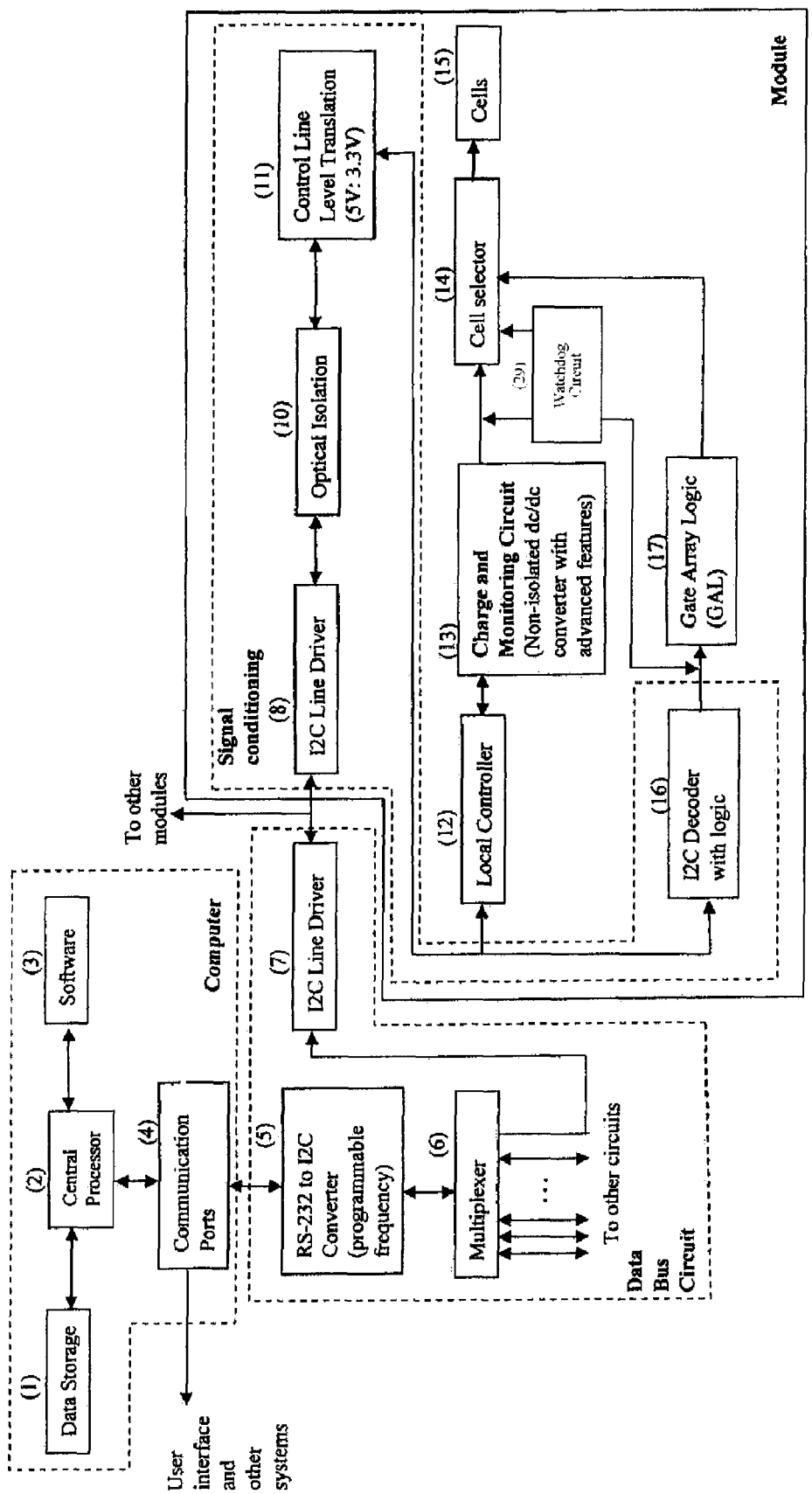
FIGS. 1 and 2 are schematic/block diagrams of a first embodiment of the invention.
Figure 2:
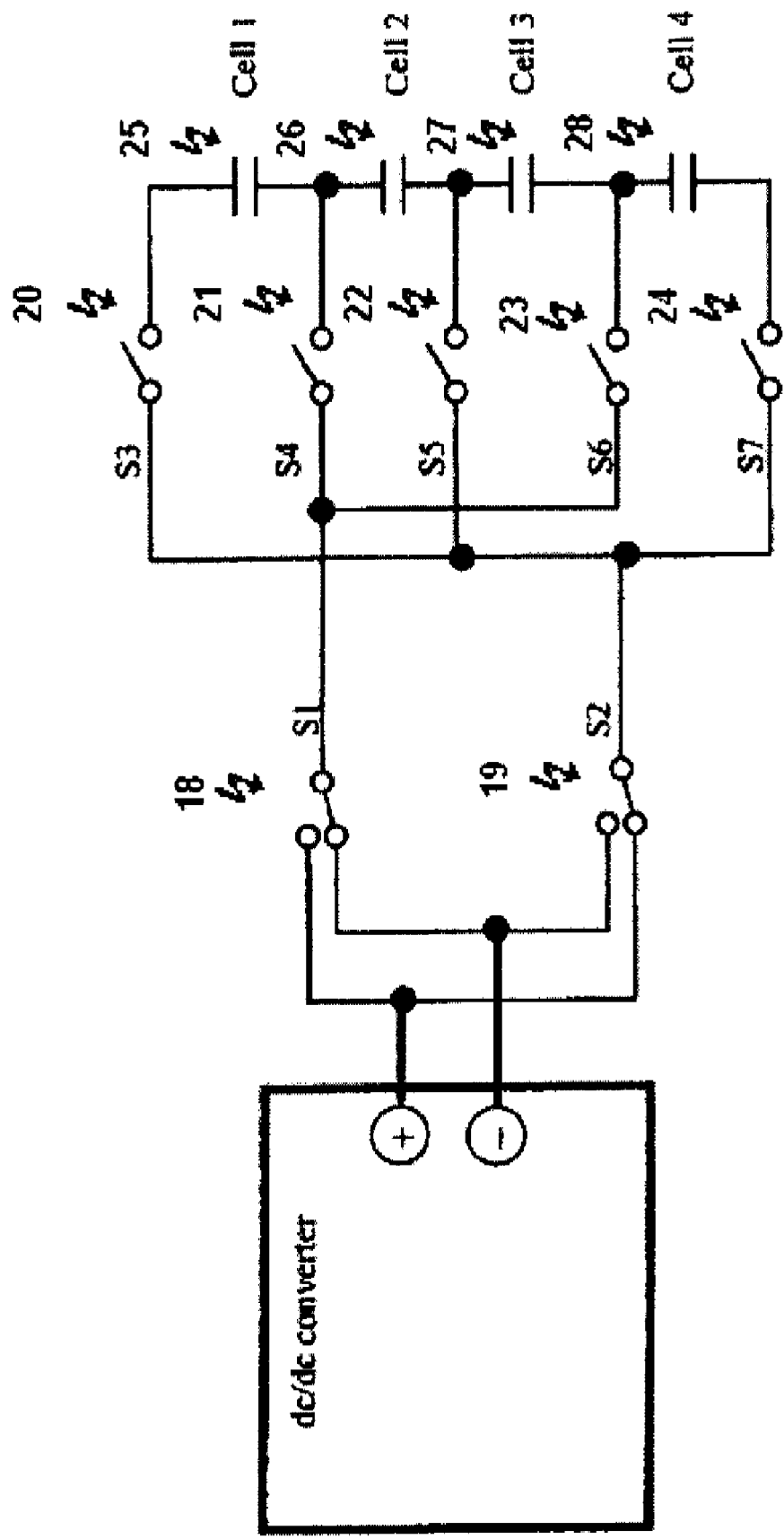

FIG. 1 illustrates the overall apparatus for managing individual cells and strings according to the present invention. FIG. 2 is representative of the specific arrangement of switches for cell selection (14). The system is used in conjunction with an "external" or "main charger that is used for bulk charging of the string(s) and is not shown. Likewise, the load is not shown. As shown in (FIG. 2), a string has a plurality of cells (25, 26, 27, 28) connected electrically in series with one another by cell connectors or terminals. The terminals provide for access to each individual cell in the module. Each cell has a positive and a negative terminal associated with the positive and negative plates of the cell. A first one of the series of cells and a last one of the series of cells are regarded as the terminals of the module.

A cell selector or coupling mechanism (14) is operable to make connections to the appropriate terminals of each cell so that each individual cell (25, 26, 27, 28) of the module can be analyzed or charged. Cell selector (17) is responsive to command signals from Gate Array Logic (17), an I²C decoder, and, via a Data Bus Circuit, a central processor (2).

A selector or coupling mechanism (18, 19) is used to make the appropriate positive or negative connection to the individual cell selector or coupling mechanism (20, 21, 22, 23, 24). Use of the selector or coupling mechanism (18, 19) decreases the required number of selector or coupling mechanisms from 2*N, where N represents the total number of cells within a configuration without the selector or coupling mechanism (18, 19), to only N+1 with the selector or coupling mechanism (18, 19), thus enabling a significant cost savings.

A charge and monitoring circuit (13) for delivering electrical energy to a cell is selectively connected to one of the individual cells (25, 26, 27, 28) by the proper organization of selector mechanisms ((18-24). For example, to properly connect to cell 4 (28) selector mechanisms S1 (18) and S2 (19) are place in the 1 position and S6 (23) and S7 (24) are closed. The charge and monitoring circuit (17) includes a step-down power supply capable of delivering in excess of fifteen (15) amperes of direct current for charging of cells (25, 26, 27, 28). The charge and monitoring circuit (13) also has the ability to both source or sink power in a time varying fashion (dc and ac power) in order to determine the impedance of a cell. The charge and monitoring circuit (13) is controlled by the local controller (12) and indirectly controlled by the central processor (2).

The current delivered to a cell is set using an iterative process described in steps 1-8 below.

1. The software (3) enables a specific cell via the central processor (2), communication ports (4), Data Bus Circuit, I²C Decoder (16), GAL (17), and cell selector (14).
2. The software (3) directs the local controller (12) to direct the charge and monitoring circuit (13) to measure and report back the voltage of the first cell in the first module (i.e. Vmod1cell1).
3. The software (3) stores in memory and on disk the time stamped value of Vmod1cell1.
4. Based on the value of Vmod1cell1, the software (3) sets the output of the charge and monitoring circuit (13) to a value of Vmod1cell1 plus a positive offset (X).
5. The software (3) directs the local controller (12) to direct the charge and monitoring circuit ((13) to measure and report back the current of the first cell in the first module (i.e. Imod1cell1).
6. If Imod1cell1 is below a set point value, the software (3) sets the output of the charge and monitoring circuit (13) to a value of Vmod1cell1 plus an additional positive offset (Vmod1cell1+X+Y). If Imod1cell1 is at or above a set point value, the software (3) jumps to step eight (8). If Imod1cell1 is below the set point value steps five and six are repeated, with the value of Y continually increasing, until either the target set point for the current or an upper limit is achieved. The final value of Imod1cell1 as well as the value of Vmod1cell1 is stored in memory and on disk with a time stamp.
7. Steps 1-6 are repeated for all modules within the string.
8. After the current has been set on all modules, the software advances to the second cell within the first module and repeats steps 3-7 one cell at a time (2,3, . . . ) for all cells within all modules.

The voltage and current measurements of cells (15) are taken individually and in sequence (first module—first cell, second module—first cell . . . first module—second cell, second module-second cell . . . ). Thus, for a given number of cells and modules the time interval is always known or can be calculated.

The measurements of the charge and monitoring circuit (13) both with and without power flow, are indicative of the electrochemical status of the cell being charged (i.e. if current flows at a higher rate and the voltage is low, the cell is under charged; if current flows at a lower rate and the voltage is higher the cell is more fully charged. Thus, variations in the voltage, in the current, and in the relationship between the voltage and current (resistance and impedance) can indicate electrochemical deterioration in the cell and associated connections.

The embodiment allows the use of an non-isolated dc/dc converter within the charge and monitoring circuit (13). An isolated ac/dc power supply (not shown) is used to provide external power to the circuitry within the module.

An I²C decoder with logic (16) is used to decode the signals received on the I²C bus from the central processor (2) and, in conjunction with the GAL (17), to control the arrangement of the cell selector (14)

A I²C line driver (8) is used increase the distance over which digital communication signals can be transmitted allowing the use of cables greater than three feet in length.

A Control Line Level Translation (11) circuit is used to condition the signals levels from the Optical Isolation Circuit (10) so they are compatible with the local controller (12).

An Optical Isolation Circuit (10) is used to allow communication to only one central processor (2) Because of the series connection of modules, there is not a common electrical connection from which all communication signals can be referenced. The use of optical isolation allows the establishment of a common reference on the microprocessor side of the isolator.

The multiplexer (6) is used to expand the useable number of addresses available on the data bus circuit so that each module has a unique address.

The RS-232 to I²C Converter (5) is used to convert the standard port protocol (RS-232) into I²C protocol at a baud rate compatible with optical isolation circuit (10).

Central Processor (2) receives the digital signals of voltage, current, and temperature from the charge and monitoring circuit (13). Software (3) acts as instruction means for recording and analyzing. Thus, the system according to the present invention can perform tests devised by the operator.

Digital storage, in the form of magnetic or electronic storage media, is depicted as Data Storage (1) is operably associated with the central processor (2) for recording the value of the predetermined relationships, the value of the digital signals, and other information.

A watchdog circuit (29) is used as a fail-safe control of the cell selector. The watchdog circuit (29) monitors the presence of voltage at the cell selector (18). If the voltages does not measure zero within a fixed time period the watchdog circuit will cause all cell selector or coupling mechanisms to move to a position of zero power transfer until a okay signal is received which will then reset the time period releasing control of the selector or coupling mechanisms.

Following are descriptions of terms used in this specification.

The finishing charge is part of the equalization circuit and is use to equalize all cells. At most the, finishing charger supplies a small, fractional percentage of the discharge current. The amount of finish charge needed is directly related to the duty cycle and depth of discharge for the string.

A buck power supply or charger for delivering electrical energy to a cell is selectively connected to one of the individual cells, by selector mechanisms (polarity relays, and cell relays). The buck power supply is an adjustable (programmable) voltage source power supply that is capable of delivering as much as fifteen (15) amperes of direct current for charging cells. The buck power supply also has the ability to both source or sink current.

Integral to the buck power supply is a mechanism to measure and control the voltage at it's output, the current flowing, and to measure the temperature local to the buck power supply. Independent measurements of voltage, current, and temperature are taken in response to program instructions (software) residing in microprocessor. "Independent" means that voltage and/or temperature may be measured without or without current flow and so on.

The invention can ascertain voltage while charging and discharging of the string is occurring and under no-load conditions. Each cell is continuously analyzed in a sequence to confirm availability and electrochemical status.

Arrangement of Switches (In the Cell Selector)

A mechanism is needed to allow switching among the various cells. Switching must be break-before-make and be designed to prevent shorting between cells. The speed of switching must be fast enough to prevent overcharging and undercharging of the cells under all circumstances. However, during discharge it may be possible to create an algorithm that only monitors one cell as a reference. What is important is not the absolute value of every cell, but the relative value. The assumption made is that the equalization circuit is working and all cells are within a small tolerance of one another, a condition that should normally exist.

The cell selector should also have built-in failure detection to prevent shorting between any two cells. This could be accomplished by having the selector move to a neutral state between cells. The neutral state is defined so that separation can be verified, meaning that the switch is working properly.

A selector or coupling mechanism is operable to make connections to the appropriate terminals of each ultracapacitor cell so that each individual cell of the string can be analyzed or charged, as described in greater detail below. Selector is responsive to command signals from a logic controller (I²C decoder) and microprocessor.

A selector or coupling mechanism (polarity relays) is used to make the appropriate positive or negative connection to the individual cell selector or coupling mechanism. Use of the selector or coupling mechanism decreases the required number of selector or coupling mechanisms from 2*N (where N represents the total number of ultracapacitor cells within a configuration without polarity relays) to only N+1, thus enabling a significant cost savings.

Local Controller

The invention makes use of a digital processing module (DPM). The DPM communicates digitally with the buck power supply. The DPM is physically close to the buck power supply. The DPM communicates with and is controlled by the microprocessor. A key advantage of the DPM is that all voltage, current, and temperature readings made by the buck converter are transferred back to the microprocessor using a digitally encoded format. The digitally encoded format provides the system advantage of reducing susceptibility to both radio frequency and electromagnetic frequency interference (RFI and EMI). Other advantages of the DPM and buck converter combination is the ability to: change the frequency at which the converter operates, adjust the digital filtering within the buck converter, etc.

Microprocessor

There are two types of microprocessors—one on each module, called "local controller," and one master controller that controls the entire system, called "central processor".

Central Processor

This device is a "controller" as a "central processor" for clarity. The controller is a microprocessor that contains the logic necessary to properly control the equalization circuit. It has data acquisition for reading the cell voltage, drivers that control the selection of and time spent at each cell, and communications with the bulk charger, fault indicators, and other system controllers. The controller has the capability to detect and indicate the status of any cell, either that the cell is weak or that the cell has failed. The microprocessor receives the digital signals of voltage, charge current, and temperature from the buck converter via (list all part). Software on the microprocessor acts as instruction means for recording and analyzing. Thus, the system according to the present invention can perform the tests described elsewhere in this specification as well as tests devised by the operator.

Digital storage, in the form of magnetic or electronic storage media, is depicted as storage means and is operably associated with the microprocessor for recording the value of the predetermined relationships, the value of the digital signals, and other information. Microprocessor has further instruction means in which causes the processor to actuate selector mechanism, as described below.

Signal Conditioning

The signal conditioning comprises the communication bus and voltage isolation.

The Inter-IC bus, commonly known as the I²C ("eye-squared-see") bus, is a control bus that provides the communications link between integrated circuits in a system. Developed by Philips in the early 1980s, this simple two-wire bus with a software-defined protocol has evolved to become the de facto worldwide standard for system control. This bus is used to communicate between the main system controller and the digital power manager (DPM) of the ultracapacitor modules. Bundled with the bus is a multiplexing system to allow unique addressing of specific components.

Figure 8:
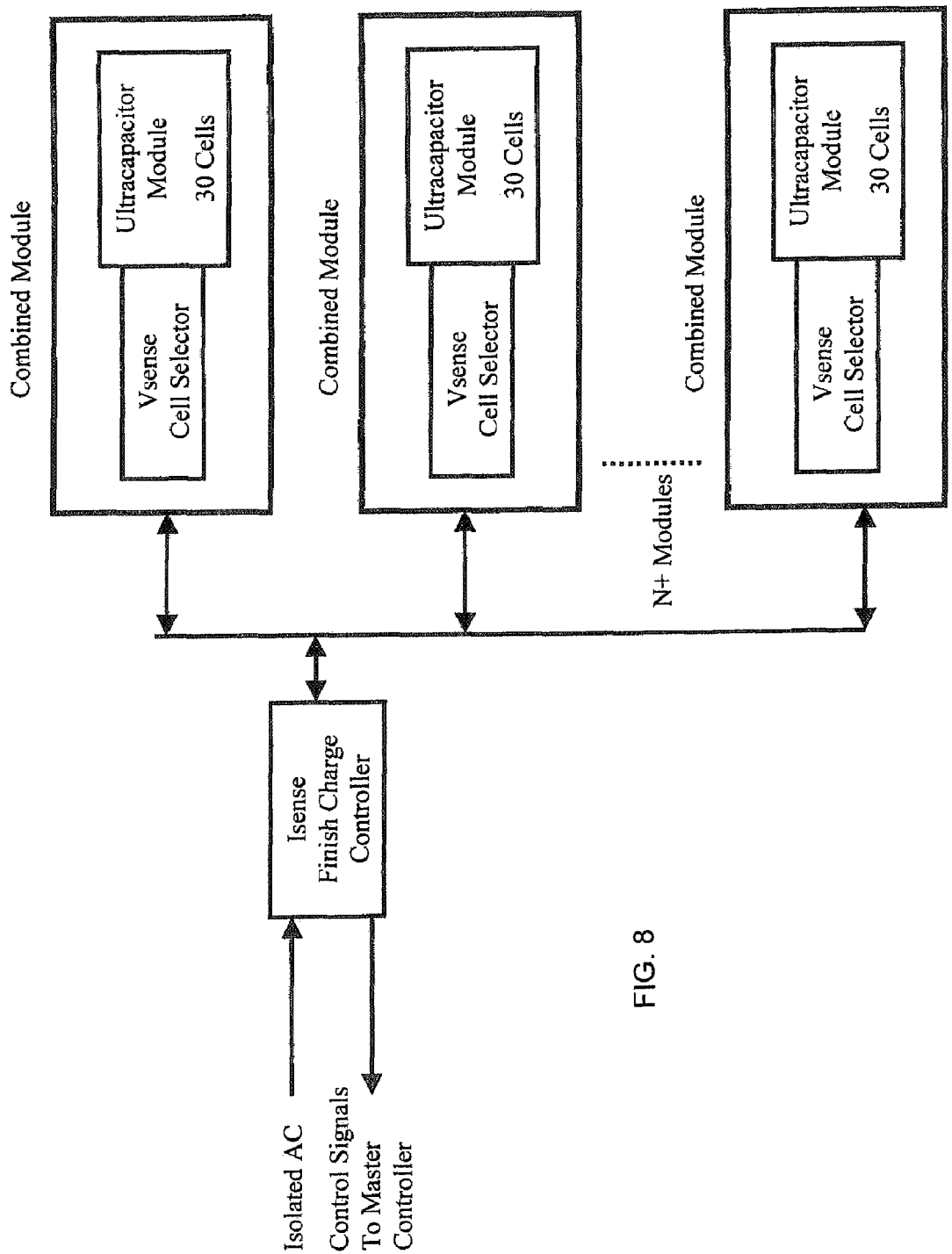
Figure 9:
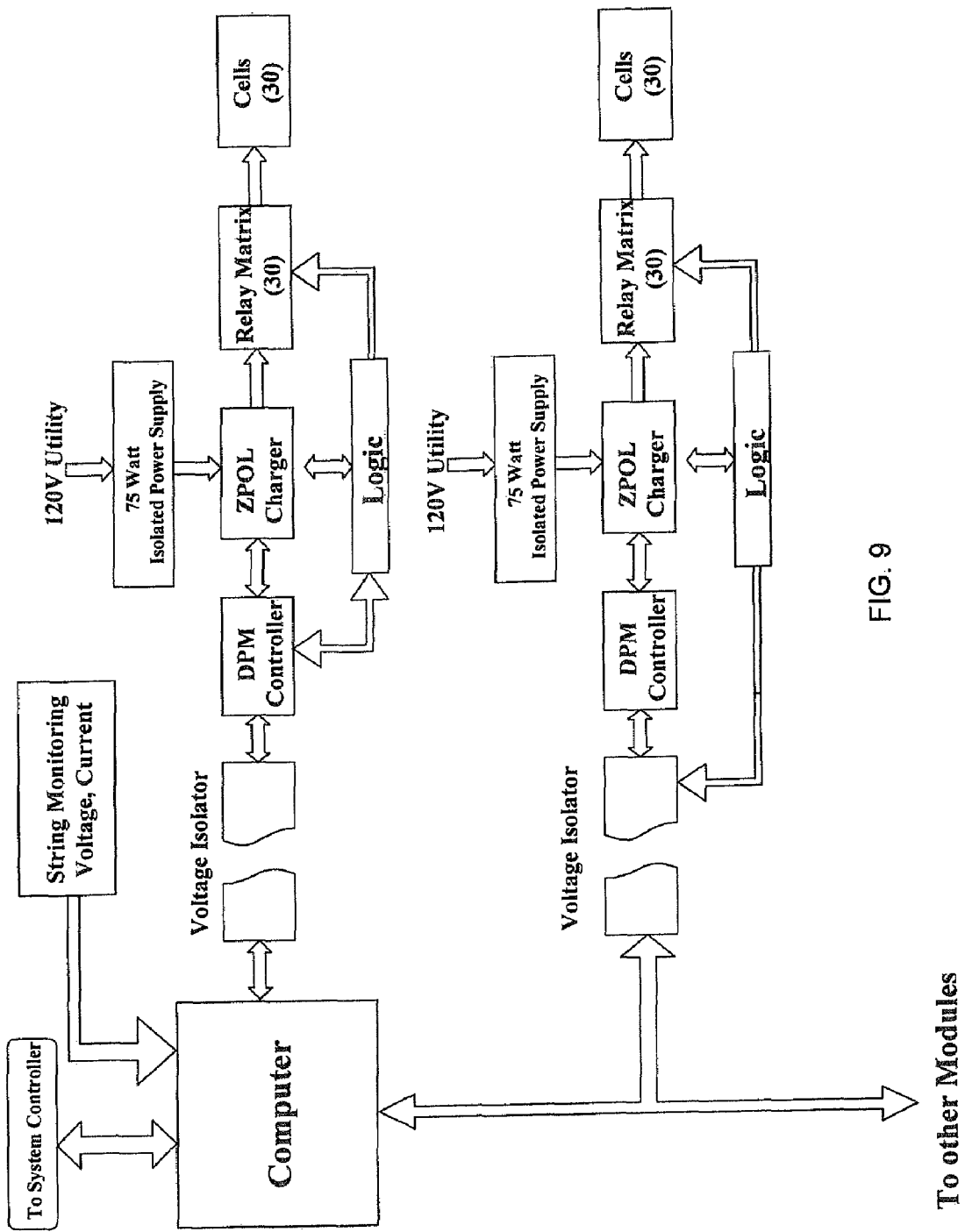
Figure 10:
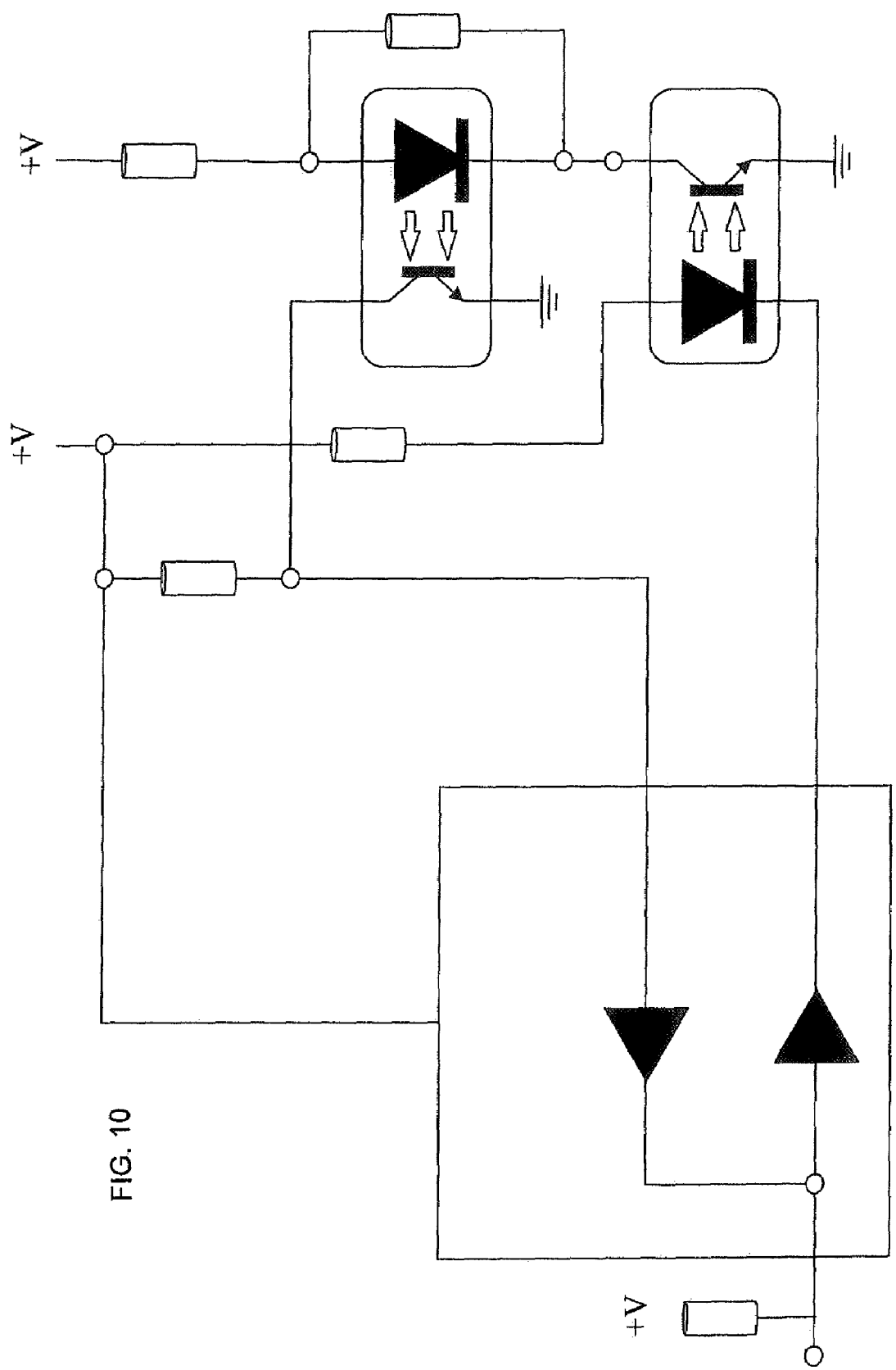

However, because the bus must interface with modules at various levels of voltage a voltage isolator circuit is required. A simplified schematic of the voltage isolator is shown in FIG. 8. The isolator allows for isolation up to five thousand voltages and data transfer rates up to 5 kHz.

An $I^2C$ logic decoder is used to decode the signals received on the $I^2C$ bus from the microprocessor to allow proper arrangement of the polarity relays and cell relays in response from software within the microprocessor.

A signal conditioning circuit is used to condition the signals levels from the Optical isolation circuit so they are compatible with the DPM.

An optical isolation circuit is used on each module (define module) so that all modules can communicate to only one microcomputer. (Because of the series connection of modules, there is not a common electrical connection from which all communication signals can be referenced. The use of optical isolation allows the establishment of a common reference on the microprocessor side of the isolator.

Also, there is a data bus that connects the signal conditioning on each module with the master controller. This is composed of one or more multiplexers and one or more signal conditioners.

The multiplexer is used to expand the useable number of unique addresses so that each module has a unique address.

The signal conditioner (variable frequency $I^2C$ converter) is used to convert the standard port protocol (RS-232) into $I^2C$ protocol at a baud rate compatible with optical isolation circuit.

Communication Ports

These ports are simply inputs and outputs from the master controller to allow it to interact with users or other systems (such as a monitoring computer operated by the electric utility) to upload data, send alarms, and so on.

Software

1. The software directs the (GAL) logic to enable the specific relays within the relay matrix such that the output of the ZPOL is connected to the first cell of the first module.

2. The software directs the DPM controller to direct the ZPOL Charger to measure and report back the voltage of the first cell in the first module (Vmod2cell1).

3. The software stores in memory and on disk the time stamped value of Vmod1cell1.

4. Based on the value of Vmod1cell1, the software sets the output voltage of the ZPOL Charger to a value of Vmod1cell1 plus a positive offset (X).

5. The software directs the DPM controller to direct the ZPOL Charger to measure and report back the current of the first cell in the first module (Imod1cell1).

6. If Imod1cell1 is below a set point value, the software sets the output voltage of the ZPOL Charger to a value of Vmod1cell1 plus a positive offset (X+Y). If Imod1cell1 is at or above a set point value, the software jumps to step 8. Steps six and seven are repeated, with the value of Y continually increasing, until the target set point for the current is achieved. Imod1cell1 is stored in memory and on disk with a time stamp.

7. (Sets 2-6) are repeated for all modules within the string.

8. After the current has been set on all modules, the software advances to the second cell within the first module and repeats steps 3-8 one cell at a time (2,3, . . . ) for all cells within all modules (for the 2,000 V bank there are forty-five total modules with 30 cells per module).

The invention also is directed to a transmission ultracapacitor (TUCAP) system or machine designed to increase the power transfer limits and stability of an electrical power transmission system by providing dynamic reactive-power compensation augmented by short bursts of real-power injection and absorption. The inventive TUCAP system can also provide a wide range of power-quality improvements.

At present, reactive power compensation is accomplished primarily through the use of fixed or mechanically switched capacitor banks. These devices, while effective, react relatively slowly to the constantly changing conditions of a transmission grid. Dynamic reactive power compensation, which responds much more quickly to the variable requirements for reactive power compensation, can improve transmission stability and increase power transfer limits. This concept has led to the development of FACTS (Flexible AC Transmission System) control devices, which rapidly exchange variable reactive power with the AC power system. FACTS devices of various designs have already found application in key places on the transmission grid.

The TUCAP system is an extension of the FACTS concept, consisting of a FACTS device in combination with energy storage in the form of one or more high-voltage ultracapacitor strings. This configuration, which allows the exchange of both active and reactive power with the transmission grid, has several advantages:

TUCAP provides system damping following a disturbance TUCAP provides additional damping in situations where the dynamic reactive power provided by traditional FACTS devices with similar ratings is inadequate (or can provide the same damping at less cost).

TUCAP provides energy to maintain the speed of locally connected induction motors during power system disturbance, possibly averting a voltage collapse in areas in which there are a large number of induction motors that would otherwise stall.

These benefits allow the TUCAP system to bring significantly more value than a FACTS system alone.

The TUCAP concept is not the first application of energy storage with a FACTS device. FACTS devices have been combined with battery energy storage systems (BESS), and notably with superconducting magnetic energy storage (SMES) in the D-SMES product developed by American Superconductor Corporation. TUCAP differs from these products in two fundamental ways:

The FACTS device in the TUCAP system is based on a high-voltage, high-current semiconductor switch that allows operation with a dc bus voltage above 1000 V, allowing more efficient operation with less auxiliary equipment then BESS and SMES systems that operate at a lower voltage.

The energy storage in the TUCAP system is based on ultracapacitors, energy storage devices that have a very high power capability in relation to their physical weight and volume.

Ultracapacitors, are also known as supercapacitors or electrochemical capacitors, are a relatively new energy storage technology with several advantages over conventional batteries. Ultracapacitors have power capabilities greater than batteries of the same weight and volume, but contain less energy. This means that ultracapacitors are well suited for applications that require a large amount of power for a short period of time.

Individual ultracapacitors operate at relatively low voltages (2.3 to 4 volts). The construction of an ultracapacitor system that operates at higher voltage requires that individual ultracapacitors be linked in series. A series string of ultracapacitors will need special controls to ensure that individual ultracapacitors remain within their voltage limits during operation.

Ultracapacitors are also known as supercapacitors, electrochemical capacitors (EC) or electrical double-layer capacitors (EDLC), and are devices which store energy in the electrical double layer at an electrode/electrolyte interface. As with conventional capacitors, the energy storage capacity of ultracapacitors is proportional to the area of the electrodes and to the square of the maximum voltage that can be applied, and inversely proportional to the distance of charge separation between electrodes. Ultracapacitors achieve very high capacitance and energy capacity through very high electrode surface areas and very small charge separation distance.

In its simplest form, an ultracapacitor consists of two electrodes immersed in an electrolyte solution that contains both positive and negative ions.

When an electric potential is applied across the electrodes, negative ions in solution are attracted to the more positively charged electrode, while positive ions are attracted to the more negatively charged electrode. At reasonably small voltages, the charge does not move across the electrode-electrolyte interface, and the separation of charges at each electrode-electrolyte interface constitutes a capacitor with a very small charge separation difference (0.1 to 10 nm).

The electrodes for ultracapacitors are often composed of activated carbon, which has very high surface area properties, but may be composed of any electrically conductive high-surface area material that does not chemically react with the electrolyte. Other such materials may include carbon aerogels, conductive polymers, or inert metals. In some instances one or both electrodes are composed of electrochemically active materials, such as ruthenium oxide, that result in capacitor-like behavior when used as electrodes. Devices using such electrodes (called pseudocapacitative materials) are also referred to as ultracapacitors.

Ultracapacitors, such as those described above, in which both electrodes are composed of identical materials, are called "symmetric ultracapacitors." Some devices are constructed with two different electrodes; such devices are called "asymmetric ultracapacitors." One electrode in an asymmetric ultracapacitor is composed of a material that acts as a capacitive element, as described above for symmetric ultracapacitors. The other electrode in an asymmetric ultracapacitor may be another type of capacitive element, such as a pseudocapacitor electrode or a metal oxide capacitor electrode, or some other charge storage material such as a battery electrode. Because the charge storage mechanism for such asymmetrical devices is still primarily within the capacitative element, they exhibit the behavior of a capacitor, and are called ultracapacitors.

Ultracapacitor energy storage has the following advantages over BESS systems:

Ultracapacitors have high power density (power per volume) and specific power (power per weight), allowing the construction of transportable systems. Comparable BESS systems will be larger and bulkier when sized for a particular power.

Ultracapacitors can absorb power as quickly as they can discharge it, meaning that the TUCAP system can use both power injection and absorption to provide stability. BESS systems cannot absorb power as quickly as they discharge it.

Ultracapacitors require less maintenance and auxiliary equipment (such as cooling) than BESS systems.

Ultracapacitor energy storage has the following advantages over SMES systems:

Ultracapacitors have a relatively small module size, so that a TUCAP system can be more easily sized to meet a particular power and energy requirement. SMES units are available only in relatively large modules.

Ultracapacitors can absorb power as quickly as they can discharge it, meaning that the TUCAP system can use both power injection and absorption to provide stability. SMES systems cannot absorb power as quickly as they discharge it.

Ultracapacitors require less auxiliary equipment (such as cooling) than SMES systems.

The final TUCAP device is fully contained within a truck trailer for easy transportability and siting. The transportable nature of the TUCAP device will allow it to be placed close to a customer, or at any point that it can best serve to improve the stability of the transmission grid.

Following is a summary (without limitation) of one aspect of the invention:

The application of a medium-voltage ultracapacitor string in conjunction with a FACTS device for transmission and distribution stability applications, with particular emphasis on full four-quadrant capability (inject and absorb both real and reactive power).

The design of the special control system required to balance voltages over large strings of ultracapacitors (described below).

A computer simulation model describing the operation of the TUCAP system in particular locations on the transmission grid.

More specifically:

1. While it is known to use energy storage with reactive power compensation, it is novel that to use ultracapacitors for that energy storage.
2. It is novel that the ultracapacitor string is at medium voltage (that is, at 2 kV).
3. It is novel that energy storage is used for both energy injection to the grid, and energy absorption from the grid.
4. The control system required to balance voltages over large series strings of ultracapacitors, as described below, is novel.
5. The computer simulation model of the operation of the TUCAP system in particular locations on the transmission grid is novel.

The TUCAP system is composed of two major parts:

A medium-voltage string of ultracapacitors, and

An ETO-based power converter.

Ultracapacitors

Ultracapacitors are electrical storage devices that store energy in the electrical double-layer at the interface between a solid electrode and a liquid electrolyte. These devices typically have a rated voltage between 1 $V_{dc}$ and 3 $V_{dc}$. These devices have the electrical characteristics of a capacitor; namely, the charge stored is proportional to the voltage, and energy storage is proportional to the square of the voltage.

Ultracapacitors previously have not been used in transmission and distribution applications of the kind to which the invention is directed, because individual cells have voltage ratings too small to be useful in these applications.

The TUCAP system links large numbers of individual ultracapacitors in series to produce medium-voltage strings. A prototype string has been constructed, reducing this invention to practice. The prototype string is rated at 2000 $V_{dc}$, and operates between 1000 $V_{dc}$ and 2500 $V_{dc}$.

Strings rated at higher voltages, up to 10000 $V_{dc}$, are also contemplated. Strings of this size require several thousand ultracapacitors in series.

The TUCAP system may employ one or more such strings in parallel to provide a higher power requirement at the same voltage. Furthermore, the power converter may require one or more strings for each phase of the output.

The TUCAP system requires circuitry for voltage balancing across all cells to ensure that no individual cells are overcharged during charge operations, or over-discharged during discharge operations. Various means by which voltage balancing can be accomplished in the TUCAP system are described below.

Power Converter

The power converter is a 3-phase power converter that draws DC current from an energy storage device at constant voltage, and converts it into high-voltage AC power. The power converter also operates in reverse, to draw AC power from the grid and convert it into DC current and voltage. In addition, the power converter is capable of VAR (Volt-Ampere-Reactive) compensation without a real power component. The power converter is a "true" four-quadrant converter in that it can produce any combination of real and reactive power that may be necessary for grid stabilization or other operational modes of the device.

The power converter acts to stabilize the transmission grid by injecting or absorbing real and reactive power from the grid as necessary. When injecting real power, it draws energy from the ultracapacitor, which is capable of delivering this energy at a very high rate. When absorbing real power, the energy is used to charge the ultracapacitor, which temporarily absorbs it.

Energy storage devices previously used in this application cannot absorb energy as quickly as they release it. This means that a separate device must be used to dissipate energy when the power converter must act to absorb energy from the grid. Ultracapacitors, in contrast, can absorb energy as quickly as they release it. The ultracapacitor cells used in the TUCAP application have the ability to temporarily store more energy than their storage rating. This allows the ultracapacitor string to absorb energy even if it is fully charged, removing the need for a secondary device to dissipate power when it is absorbed from the grid. The energy stored above the storage rating of the cell can be used if it is required in a relatively short time after it is stored.

The detailed design of the power converter is described elsewhere and need not also be described here. However, two aspects of the high-voltage converter are relevant to this invention:

1. The inventive TUCAP system uses a high-voltage thyristor that allows high switching speed while also allowing operation at a relatively high bus voltage. The TUCAP system can, therefore, operate at high efficiency with a bus voltage of at least 2000 $V_{dc}$ and as high as 10,000 $V_{dc}$.

2. The power converter is a multi-level inverter that converts DC current and voltage into AC power through rapid switching following a complex control algorithm. The control algorithm may change depending on the operational mode of the TUCAP device. Possible control algorithms for the power converter are described elsewhere.

Figure 3:
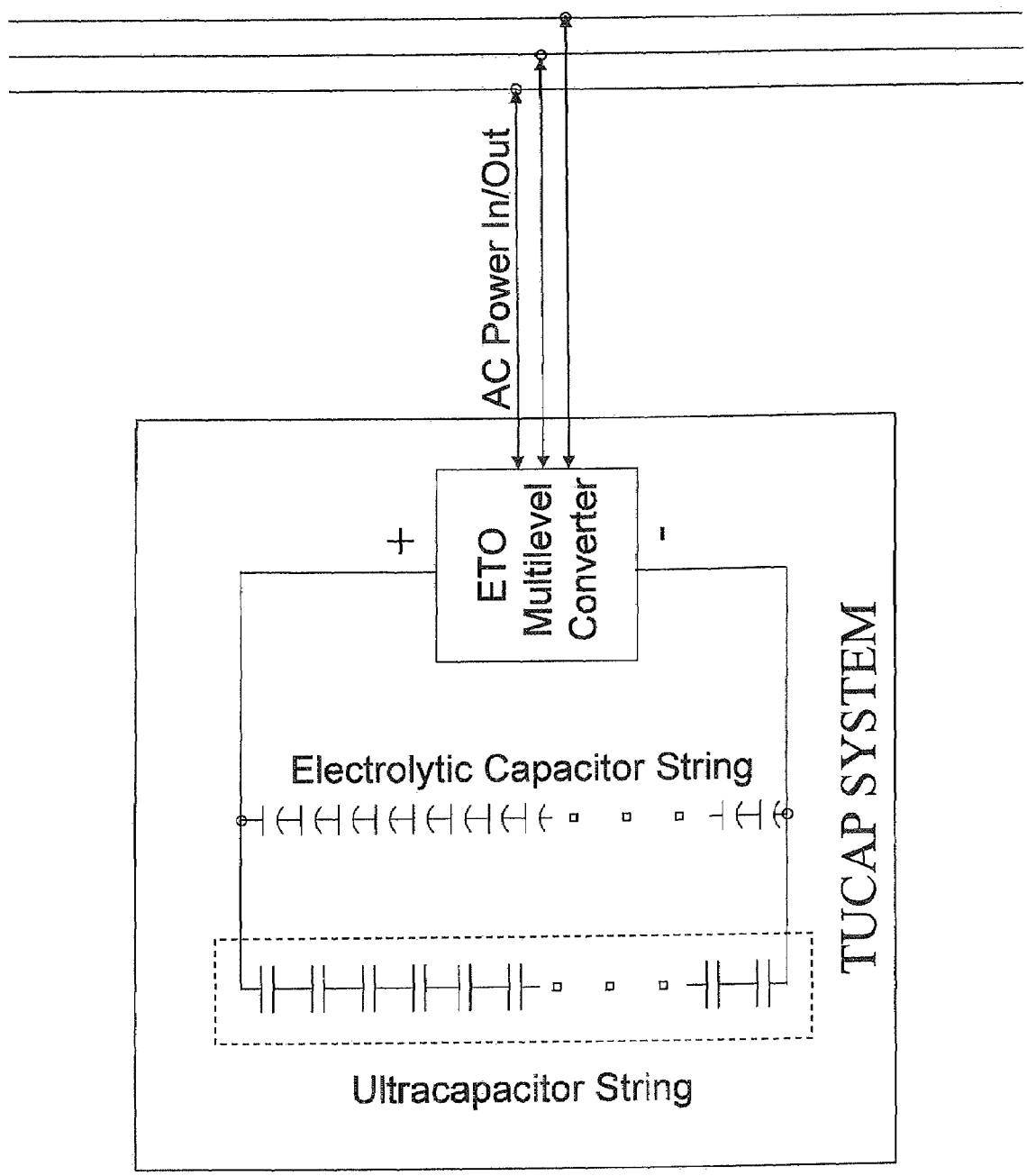
FIGS. 3-10 are schematic/block diagrams of a second embodiment of the invention.

A simplified electrical schematic of the inventive TUCAP system is shown in FIG. 3, with an ETO (Emitter Turn Off) multilevel converter. The ETO is one example of a high-voltage thyristor that allows a high switching speed.

Ultracapacitors do not have adequate frequency response to allow cycling during VAR compensation operation. Furthermore, the pulse-width-modulation operation of the power converter can result in overheating of the ultracapacitor string. For these reasons, a series string of electrolytic capacitors is required in parallel to the medium voltage ultracapacitor string.

If the power converter does not require a separate DC bus for each phase of the output, then one ultracapacitor string can serve as the bus for the entire power converter, as shown in FIG. 3. In some cases, the power converter may require a separate DC bus for each phase of the output voltage. If this is the case, one or more ultracapacitor strings can serve as the bus for each phase, so that at least three strings are required. This configuration is shown in FIG. 4.

For efficient operation, the power converter may require a more level DC bus voltage than can be provided by an ultracapacitor string alone. This is especially true for higher voltage ultracapacitor strings. In these cases, a DC-DC converter may be installed on the output of the ultracapacitor string to produce a constant voltage bus, from which the ETO will draw power. This configuration is shown in FIG. 5.

Figure 4:
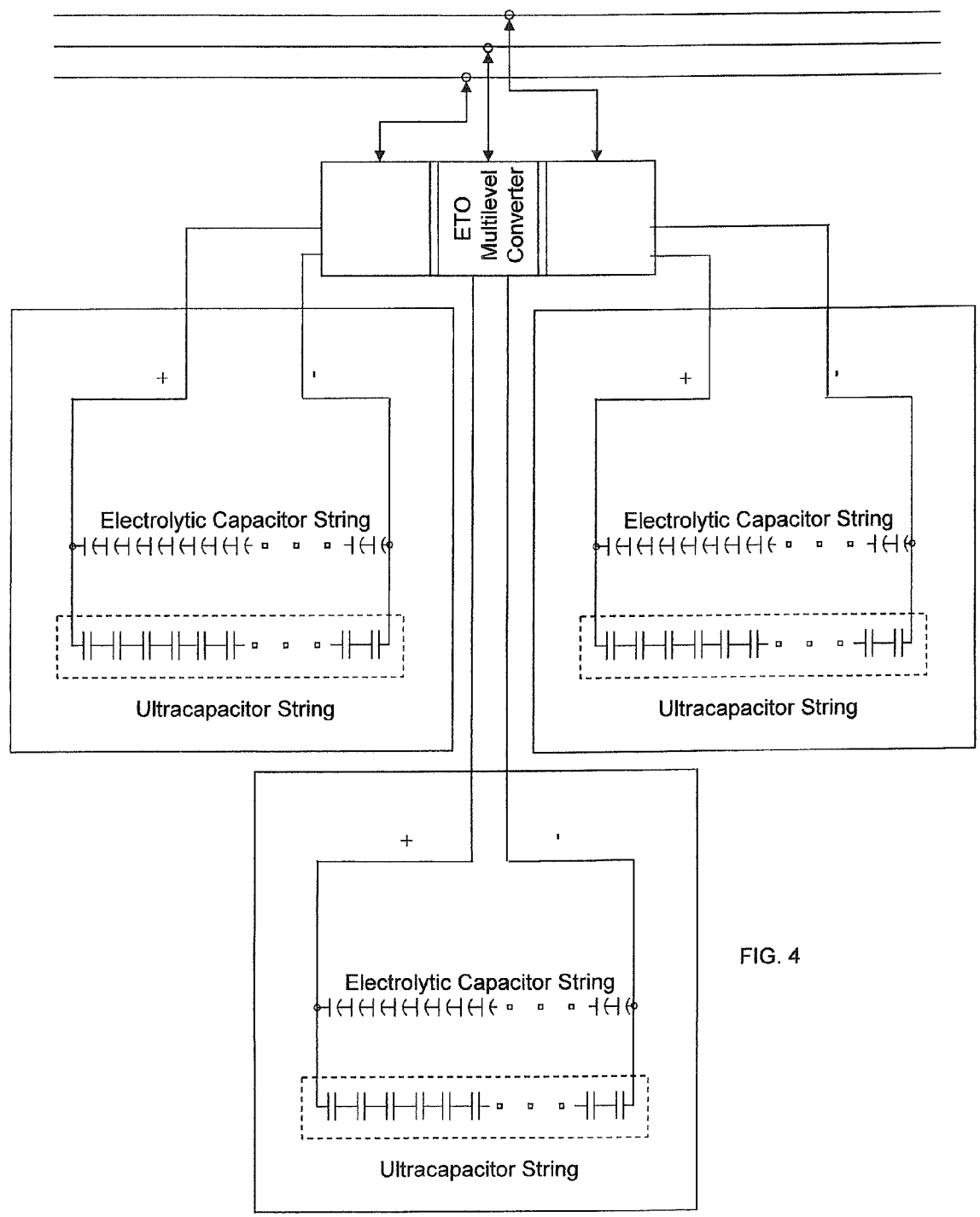
Figure 5:
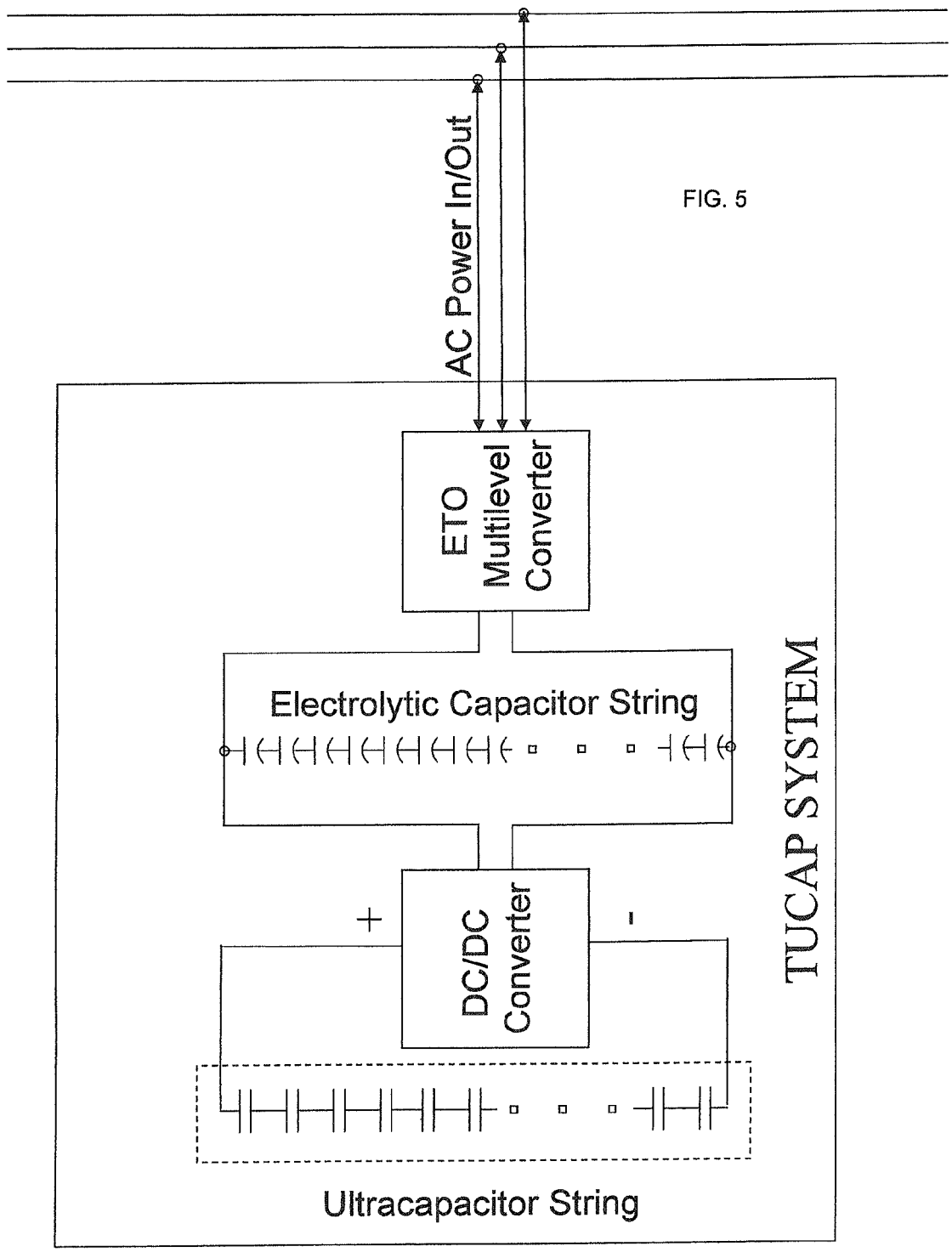

In addition to power circuitry shown in FIGS. 3-5, the TUCAP system incorporates master control circuitry; to detect and respond to events on the grid; to monitor and detect the ultracapacitor to ensure that the ultracapacitor strings are fully charged, that cells are properly balanced, and that no abnormal conditions are present; and to control and monitor the power converter.

Voltage Balancing for Large Ultracapacitor Strings

Overview

Electrochemical capacitors are inherently low voltage devices, with most advanced devices only recently approaching three volts, and, to achieve significant amounts of useable energy and power, must be placed in series. For high voltage applications, in particular, a two-thousand volt string for distribution and transmission support, as many as 1500 cells must be placed in series. Because of manufacturing tolerances in capacity, leakage current, and internal resistance, over time the difference in voltage between individual cells will increase until either one or more of the "weaker" cells have a reversed polarity resulting in gasing of the cell, failure in the form of an open circuit, or increased resistance, or one or more of the "stronger" cells gasing with eventual failure due to overcharge that produces decomposition of electrolyte. The rate at which cell voltage will diverge is directly related to the depth and number of charge/discharge cycles.

There are methods used to combat the problem of equalization among cells. Specifically, the manufacturing method can be improved and cells can be sorted based on tolerance. However, this solution has the disadvantage of higher cost and, given the difficulty of predicting degradation of cells over time, does not solve the problem. Another solution involves regulating individual cell voltage by means of an electric circuit on each cell. There are two forms of this: passive and active.

The passive method makes use of the energy within the cell itself to regulate cell voltage. Examples include either resistors (shunts) or diodes in parallel with each cell. A disadvantage of the passive method is that the rate of equalization is relatively slow; it may take hours to equalize the cells in an ultracapacitor string. Another disadvantage is that passive devices are always on and dissipate energy which must be replaced if the cells are not to completely discharge. These two disadvantages are linked: the rate of energy dissipation increases as the rate of equalization increases.

What remains is the active method, which requires individual charging of cells and the ability to be turned on and off depending on a feedback mechanism. The requirement for an active equalization circuit for a high-voltage string of ultracapacitors can be broken into subsystems that perform specific tasks. The tasks are:

Voltage Sense
　　Current Sense
　　Cell Selection
　　Charging
　　Controller

Each of these subsystems is discussed below:

Voltage Sense

The voltage sense circuit must measure the voltage of an individual cell, which is then used to determine when and when not to charge a cell. The resolution needed for the measurement is driven by the accuracy of float voltage. For the asymmetrical design, for example, the float voltage is 1.5 V with a tolerance of plus zero and minus 1%. The zero tolerance above 1.5 V is because any voltage above this value will increase the rate of electrolysis, which will increase or accelerate the requirement for adding water to individual cells. The 1% below specification is driven by the need to store energy. Because energy stored is a function of the cell voltage squared, the one percent tolerance represents a two percent decrease in stored energy.

The speed of measurement is important during discharge and charge, especially discharge under high current where it is important to prevent discharge below a minimum value. The acquisition should be fast enough to resolve a change in voltage of 0.1 V at the highest rate of discharge for the application. Furthermore, because the capacitors are connected to power electronics that operate at a high switching frequency, the monitoring circuit must have good noise rejection.

Current Sense

A given cell has a maximum charge voltage and a minimum discharge voltage. These values are not fixed but vary as a function of current due to the internal series resistance (ISR) of the capacitor. Because of this, during discharge with high current, it is possible to discharge to an apparently lower cell voltage. During practice the discharge or charge current is not fixed but will vary. Thus, adaptive references for maximum and minimum cell voltages are needed. Because of this, a means is needed to measure current in the string.

A Hall Effect sensor, as opposed to a shunt, is used in order to maintain electrical isolation. The sensor can be placed either on each module or on one for each string.

Cell Selector

A mechanism is needed to allow switching among the various cells. Switching must be break-before-make and be designed to prevent shorting between cells. The speed of switching must be fast enough to prevent overcharging and undercharging of the cells under all circumstances. However, during discharge it may be possible to create an algorithm that monitors only one cell as a reference. What is important is not the absolute value of every cell, but the relative value. The assumption made is that the equalization circuit is working and that all cells are within a small tolerance of one another, a condition that should normally exist.

The cell selector should also have built-in failure detection to prevent shorting between any two cells. This could be accomplished by having the selector move to a neutral state between cells. The neutral state is defined so that separation can be verified, meaning that the switch is working properly.

Charger

There are two modes during charge: bulk charge and finishing charge. Bulk charge defines the process of quickly adding charge to the ultracapacitors after a discharge and is usually accomplished by external power electronics supplying current to an entire string. In this case the word "quickly" is used to mean charge with a current value either equal to or a fractional percentage of the discharge current. The bulk charger is not considered part of the equalization circuit.

In contrast, the finishing charge is part of the equalization circuit and is use to equalize all cells. At most, the finishing charger supplies a small, fractional percentage of the discharge current. The amount of finish charge needed is directly related to the duty cycle and depth of discharge for the string.

There are two ratings for the finish charge, peak and average. The average current is the time-averaged magnitude of current supplied by the charger to each cell. The peak current is the maximum current delivered by the charger, and the magnitude will depend on the duty cycle of the cell selector. For example, if each cell in a string is connected to the charger for ten percent of the total time, the ratio between peak and average will be 10:1.

Controller

The controller is a microprocessor that contains the logic necessary to properly control the equalization circuit. It has data acquisition for reading the cell voltage, drivers that control the selection of and time spent at each cell, and communications with the bulk charger, fault indicators, and other system controllers.

The controller has the capability to detect and indicate the status of any cell, either that the cell is weak or that the cell has failed.

Equalization Circuit Configurations

Figure 6:
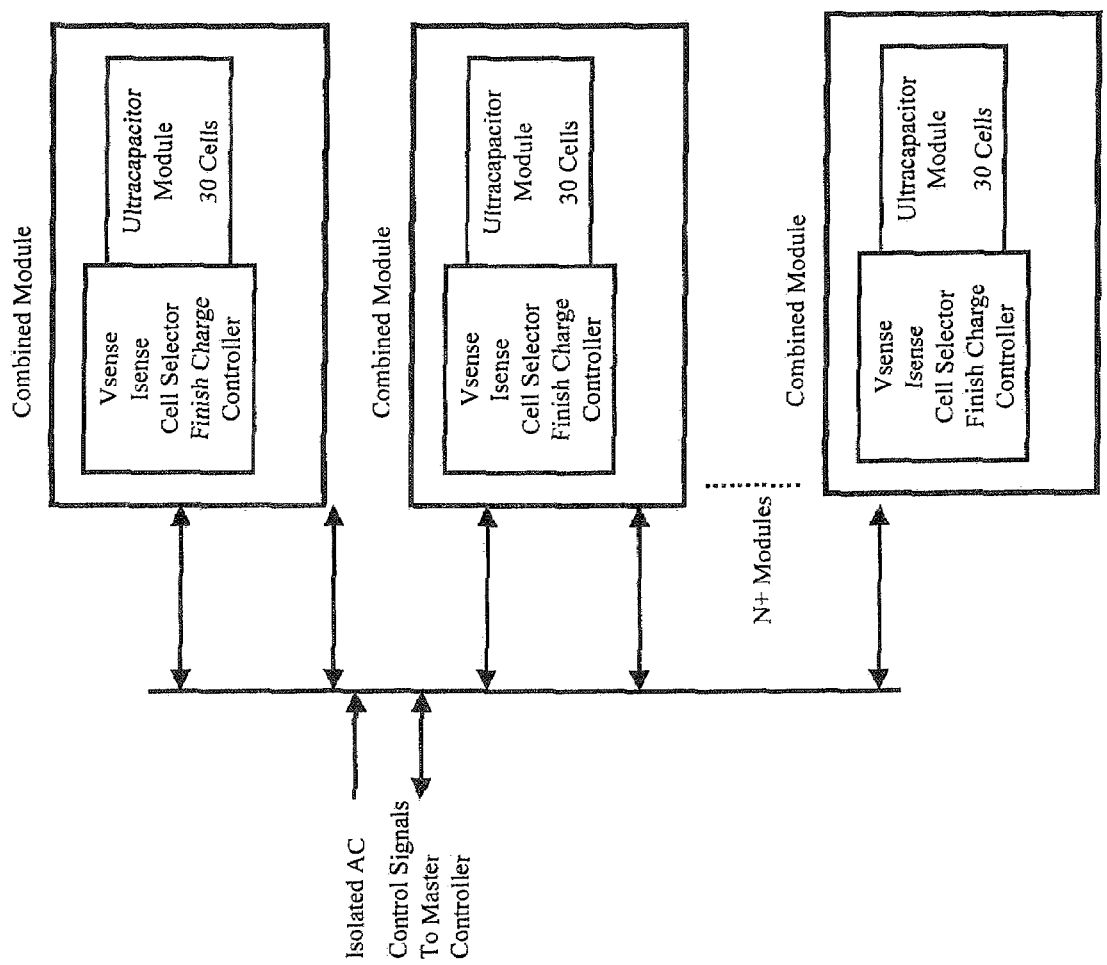
Figure 7:
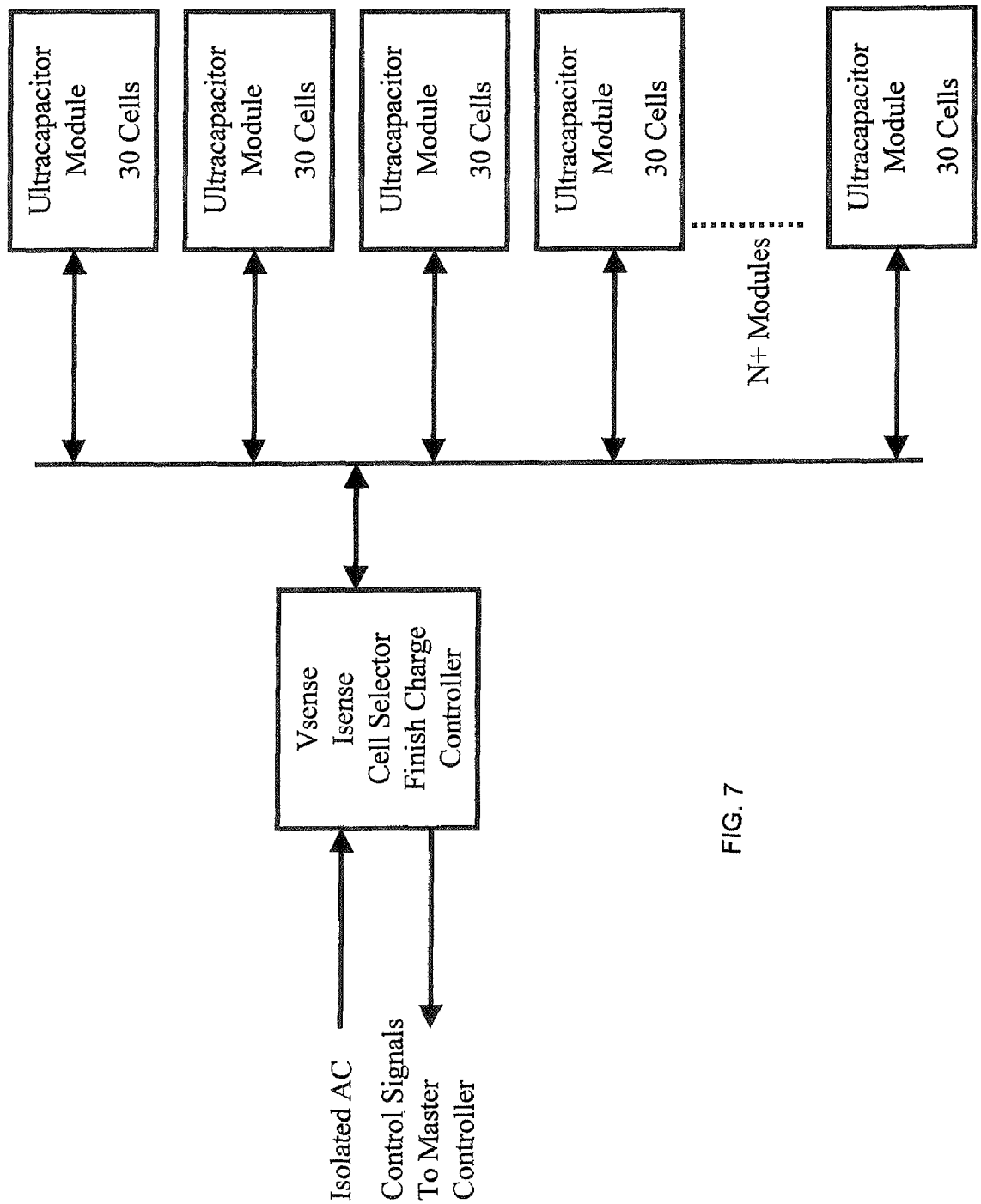

They are three variations in circuit configuration for equalization of the cells. FIG. 6 shows the configuration with the circuit placed near the module. FIG. 7 shows a configuration with one master circuit at the string level. FIG. 8 shows a hybrid with part of the circuit at the module level and part at the string level.

Other Factors

Other noteworthy factors are discussed below.

Performance

It is not necessary for the equalization circuit to equalize cells over very short time periods. As the capacitors are charged or discharged with high levels of current, some differences in voltage level between modules is expected. Any error signal generated during discharge should be masked.

Bulk discharge (or bulk charge) should be disabled once one of the cells in the string has reached its minimum (or maximum) value. If the controls have sufficient processing power, however, it may be possible to look out for cells that seem "weak" or "strong", and to ignore readings on these cells in favor of cells that posses values closer to the average of the cell population.

Safety

A main design criterion is the safety of the system. Typically, the cells will be connected to the electric utility through power electronics, and electrical isolation is required between the cells and the system cabinet, which will usually be connected to earth ground. Any circuit used for active equalization must not compromise the isolation, thus, the fewer number of isolation barriers the better.

Reliability

First and foremost the system requires reliability. In general, the fewer number of parts the better.

Cell Failure Detection

The control system should have sufficient processing power to enable detection of a failed cell. For example, if the cell has lost electrolyte, the finishing charger should not continue to try to charge the cell.

Cost

With regard to the overall system, especially when the cost of energy storage, cost of sales and cost of installation are considered, the cost for the equalization circuit, in any configuration, should not weigh heavily.

Implementation

Shown in FIG. 7 is a circuit for monitoring, leveling, and controlling (MLC) within each ultracapacitor module has been developed and demonstrated. This circuit allows for individual cell measurement, precise equalization of cell voltage, and optimization of charge current.

Specific technology used within the MLC are: an advanced, integrated power supply and controller, $I^2C$ Communication Bus (2-wires), optical Isolation Circuit (Integrated onto logic board), relay switching, gate Array Logic (GAL) with custom software, and custom software for control of the entire inventive TUCAP system.

The Inter-IC bus, commonly known as the $I^2C$ ("eye-squared-see") bus, is a control bus that provides the communications link between integrated circuits in a system. Developed by Philips in the early 1980s, this simple two-wire bus with a software-defined protocol has evolved to become the de facto worldwide standard for system control. This bus is used to communicate between the main system controller and the digital power manager (DPM) of the ultracapacitor modules. Bundled with the bus is a multiplexing system to allow unique addressing of specific components.

However, because the bus must interface with modules at various levels of voltage, a voltage isolator circuit is required. A simplified schematic of the voltage isolator is shown in FIG. 8. The isolator allows for isolation up to five thousand voltages and data transfer rates up to 5 kHz.

To switch between various cells a relay was chosen. Relays have an advantage over semiconductor switches by virtue of their high efficiency, simplified control and galvanic isolation. To control the relays gate array logic (GAL) is used. The GAL provides precise state control to prevent inadvertent shorting between two or more cells. The GAL makes use of custom GAL software. Controlling all subsystems is the system customer software operating on a dedicated computer, which communicates with other TUCAP system controllers, as well as the MLC circuit. Use of a dedicated computer allows for custom designed graphical user interface (GUI) that allows display of individual cell parameters as well as fault checking, and communication with the master system controller.

The disclosures of the following U.S. patents are incorporated herein by reference: U.S. Pat. Nos. 6,983,212; 6,710,639; 6,700,804; and 5,134,356.

Those skilled in the art will see obvious variants of the above-described embodiments of the invention which is limited only by the appended claims.

The invention claimed is:

1. A method for monitoring and controlling various parameters of individual ultracapacitor cells or group of ultracapacitor cells in a string of ultracapacitors, said method comprising the steps of:
    selectively monitoring, with a charge and monitoring circuit, various parameters, which include at least one of voltage, current, temperature, DC resistance, AC impedance, and capacity, for individual ultracapacitor cells of a string, or combinations of ultracapacitor cells within a string, or an entire string of ultracapacitor cells, and selectively delivering charge current to any individual cell or group of cells in the string, to replace charge lost due to discharge either external or internal to the ultracapacitor cell;
    selectively making, via a cell selector comprising an arrangement of switches appropriate positive or negative connections from the terminals of the ultracapacitor cell, group of ultracapacitor cells, or string of ultracapacitor cells to said charge and monitoring circuit;
    controlling, via a local controller comprising a microprocessor, the charging and monitoring parameters of the charge and monitoring circuit according to signals from a central processor,
    wherein the local controller sets other functional parameters of the charge and monitoring circuit, including at least one of switching frequency, voltage setpoints, current setpoints, temperature setpoints, and other parameters;
    allowing, via a signal conditioning circuit, signal transfer between the monitoring circuit and cell selector and the central processor while maintaining optical voltage isolation between them;
    providing the central processor which, through the signal conditioning circuit, controls the cell selector to select individual ultracapacitor cells or groups of ultracapacitor cells according to software instructions, transmits data to and receives data from the charge and monitoring circuit, and controls the operation of the charge and monitoring circuit, and
    providing the central processor with: data storage allowing the recording of data from the various ultracapacitor cells or groups of ultracapacitor cells; communication ports that allow the central processor to interact with other systems for analysis, acknowledgement of alarms, and control of all functions; and software that defines how ultracapacitor cells or groups of ultracapacitor cells must be monitored and controlled.

2. The method of claim 1, wherein critical parameters of individual cells of a string, or combinations of cells within a string, or an entire string are monitored, said parameters comprising of voltage, current, temperature, DC resistance, AC impedance, and capacity.

3. The method of claim 1, wherein the voltages of two or more cells in series are balanced.

4. The method of claim 1, further comprising providing a software algorithm which detects and annunciates cell health conditions including at least one of open circuit, short circuit, and loss of electrolyte.

5. The method of claim 1, further comprising providing a software algorithm which adjusts at least one of maximum and minimum cell, module, and string voltage as a function of charge and discharge rate.

6. The method of claim 1, further comprising providing a software algorithm which adjusts charge current as a function of cell, or module, or string voltage.

7. The method of claim 1, further comprising providing an isolated device for measurement of at least one of charge and discharge current for either cells, or modules, or strings.

8. The method of claim 1, which further comprises providing an isolated communication system that allows one central processor to electronically communicate with one or more local controllers, each local controller controlling some subsection of cells, and whose operating voltages are not referenced to the same point as that of the central processor.

9. The method of claim 8, which further comprises preventing overcharging and undercharging of individual cells, or modules, or strings.

10. The method of claim 1, further comprising providing a cell selection mechanism that allows for charging or discharging of particular cells, or modules, or strings, separately from other cells, modules, or strings.

11. The method of claim 8, wherein said controlling by the sub-processors is performed in such a way as to allow a neutral state so that isolation from the cells, modules, or strings can be detected and verified.

12. The method of claim 10, further comprising preventing the shorting of one or more cells, modules, or strings in the event of a failure of the cell selection mechanism.

13. An apparatus for monitoring and controlling various parameters of individual ultracapacitor cells or group of ultracapacitor cells in a string of ultracapacitors, said apparatus comprising:

at least one charge and monitoring circuit for selectively monitoring various parameters, which include at least one of voltage, current, temperature, DC resistance, AC impedance, and capacity, for individual ultracapacitor cells of a string, or combinations of ultracapacitor cells within a string, or an entire string of ultracapacitor cells, and for selectively delivering charge current to any individual ultracapacitor cell or group of ultracapacitor cells in the string, to replace charge lost due to discharge either external or internal to the ultracapacitor cell;

at least one cell selector comprising an arrangement of switches that selectively makes appropriate positive or negative connections from the terminals of the ultracapacitor cell, group of ultracapacitor cells, or string of ultracapacitor cells to said charge and monitoring circuit;

a local controller comprising a microprocessor that controls the charging and monitoring parameters of the charge and monitoring circuit according to signals from a central processor, wherein the local controller includes means for setting other functional parameters of the charge and monitoring circuit, including at least one of switching frequency, voltage setpoints, current setpoints, temperature setpoints, and other parameters;

a signal conditioning circuit that allows signal transfer between the monitoring circuit and cell selector and the central processor while maintaining optical voltage isolation between them; and the central processor which, through the signal conditioning circuit, controls the cell selector to select individual ultracapacitor cells or groups of ultracapacitor cells according to software instructions, transmits data to and receives data from the charge and monitoring circuit, and controls the operation of the charge and monitoring circuit, wherein the central processor includes:

data storage allowing the recording of data from the various cells or groups of cells;

communication ports that allow the central processor to interact with other systems for analysis, acknowledgement of alarms, and control of all functions; and software that defines how cells or groups of cells must be monitored and controlled.

14. The method of claim 1, further comprising supplying charging current to said ultracapacitors using a microprocessor-controlled variable-output power supply acting in a current-source mode.

15. The apparatus of claim 13, further comprising a microprocessor-controlled variable-output power supply acting in a current-source mode which supplies charging current to said ultracapacitors.

* * * * *